United States Patent [19]

Marsico, Jr. et al.

[11] 3,914,264

[45] Oct. 21, 1975

[54] 2-LOWER ALKOXY-3-(LOWER ALKYLTHIO)-1,4-NAPHTHOQUINONE

[75] Inventors: Joseph William Marsico, Jr., Pearl River; Leon Goldman, Nanuet, both of N.Y.

[73] Assignee: American Cyanamid Company, Stamford, Conn.

[22] Filed: Jan. 30, 1975

[21] Appl. No.: 545,686

[52] U.S. Cl.............. 260/396 R; 260/590; 424/331
[51] Int. Cl.$^2$...................................... C07C 149/32
[58] Field of Search............................... 260/396 R

[56] References Cited
UNITED STATES PATENTS
3,328,301  6/1967  Thompson et al............. 260/396 R

OTHER PUBLICATIONS

Hilgetag et al., "Prep. Org. Chem.," 1972, (p. 368) Ether Formation: (Alkylation by Diazomethane).

*Primary Examiner*—Vivian Garner
*Attorney, Agent, or Firm*—Edward A. Conroy, Jr.

[57] ABSTRACT

This disclosure describes novel 2-lower alkoxy-3-(lower alkylthio)-1,4-naphthoquinones which possess antifungal activity.

9 Claims, No Drawings

2-LOWER ALKOXY-3-(LOWER ALKYLTHIO)-1,4-NAPHTHOQUINONE

BRIEF SUMMARY OF THE INVENTION

This invention relates to new organic compounds and, more particularly, is concerned with novel 2-lower alkoxy-3-(lower alkylthio)-1,4-naphthoquinones which may be represented by the following general formula:

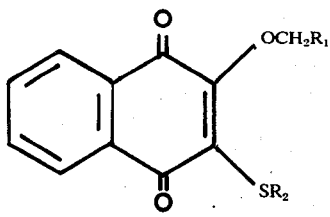

wherein $R_1$ is hydrogen or an unbranched alkyl group having from one to five carbon atoms and $R_2$ is an alkyl group having from one to six carbon atoms. Suitable alkyl groups for $R_2$ contemplated by the present invention are, for example, methyl, ethyl n-propyl, isopropyl, n-butyl, isobutyl, sec-butyl, n-amyl, isoamyl, n-hexyl, isohexyl, and the like.

DETAILED DESCRIPTION OF THE INVENTION

The novel compounds of the invention are orange crystalline solids, soluble in chloroform, dichloromethane, N,N-dimethylformamide, dimethyl sulfoxide, diethyl ether and the like, but are insoluble in water. The compounds do not form salts.

The novel compounds of the present invention (II) may be readily prepared by treating a 2-hydroxy-(3-(lower alkylthio)-1,4-naphthoquinone (I) with a diazoalkane in accordance with the following reaction scheme:

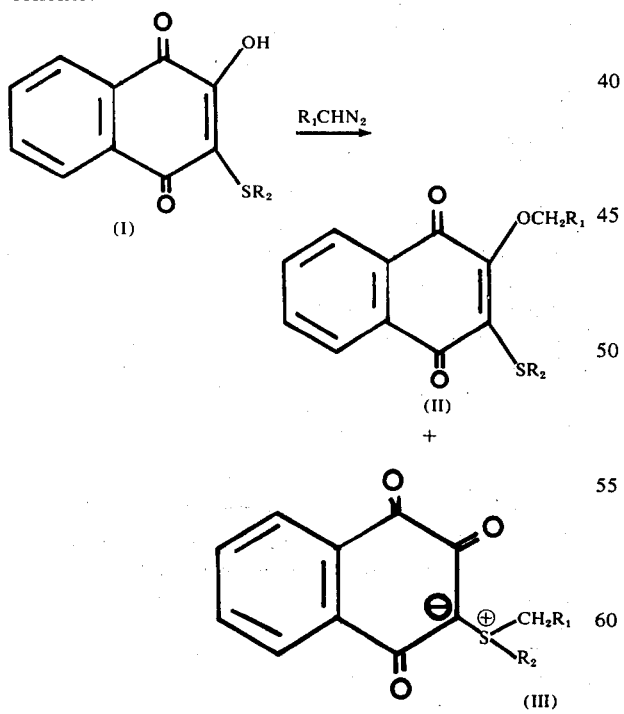

wherein $R_1$ and $R_2$ are as hereinabove defined. This reaction is best carried out in a solvent inert to the reactants such as diethyl ether or dichloromethane. Preferably, a solution of the diazoalkane is added to a solution of (I) at ice-bath temperature over a period of 5-15 minutes and then the reaction mixture is allowed to stand at room temperature for 2-5 hours. Recovery of the product (II) is readily accomplished by filtering the reaction mixture, evaporating the filtrate to dryness, and recrystallizing the residue from a lower alkanol. A by-product of the reaction is the 3-dialkylsulfonium ylide of 2-hydroxy-1,4-naphthoquinone (III).

The starting material (I) employed in the above reaction scheme may be readily obtained by the dealkylation of (III), which is fully described in U.S. Pat. No. 3,821,408. The 3-dialkylsulfonium ylides of 2-hydroxy-1,4-naphthoquinone (III) may be obtained as described by Gompper et al., Ber. 99, 527 (1966), as set forth in the above cited patent. The starting material (I) may also be prepared by the reaction of 1,4-dioxo-2,3-oxido-1,2,3,4-tetrahydronaphthalene (IV) with a sodium alkylmercaptide followed by spontaneous air oxidation of the intermediate 2-hydroxy-3-alkylthio-2,3-dihydro-1,4-naphthoquinone (V), as set forth in the following reaction scheme:

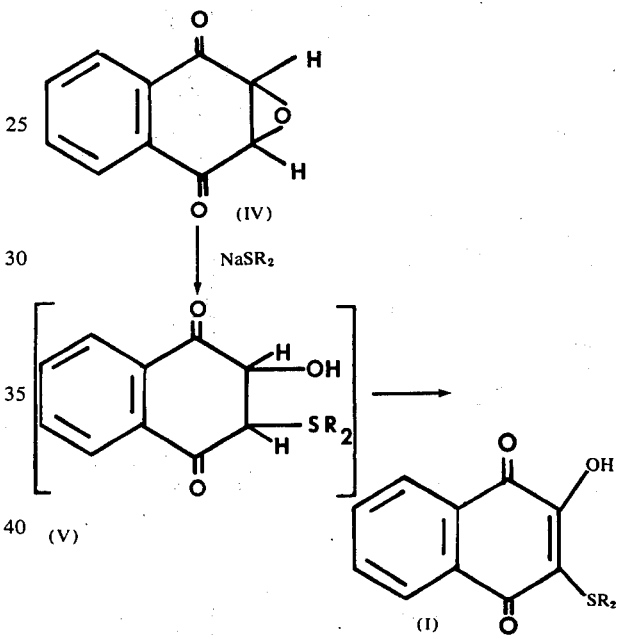

The novel compounds of the present invention are useful as antifungal agents since they possess activity in vitro against fungal cultures capable of causing disease in man and animals. This activity against a variety of standard laboratory microorganisms is determined by the agar-dilution technique. In this assay the compound to be tested is dissolved in dimethyl sulfoxide so that 10.0 mg. of test compound is contained per milliliter of solution. Observing sterile techniques, ten-fold serial dilutions of the test solution are made. A 0.2 ml., 0.1 ml., and 0.05 ml. portion of the original solution and each of the decimal dilutions are then added to, mixed with, 20 ml. of warm sterile asparagine-meat extract agar capable of supporting growth of the test culture. The standard sterile nutrient agar solutions, containing the different dilutions of the test compound, along with suitable and comparable control dilutions containing no test compound, are then allowed to cool in petri dishes, thereby forming solid agar plates. The yeast-like test fungi are prepared for use by growing in trypticase soy broth overnight. These broth cultures are diluted ten-fold in physiological saline at the time of use. The filamentous fungi are grown to maturity on slants of potato-dextrose agar. Spores and mycelia are harvested by washing the growth from the slants with sterile physiological saline solution.

Using a Steers Replicator a standardized amount of each of the resulting live suspensions is then, still employing sterile techniques, imprinted upon the surfaces of each of the agar plates and the resulting inoculated plates are then incubated. After an appropriate period of time, each of the inoculated areas on each of the plates is inspected visually and the extent, if any, of growth is noted. The minimal inhibitory concentration (mcg./ml.) is defined as the concentration of test compound causing essentially complete inhibition of any particular organism.

In a representative operation, the minimal inhibitory concentration of a typical compound of this invention against standard laboratory microorganisms, as determined in the above-described assay, is recorded in Table I below:

TABLE I

Effect of
2-Methoxy-3-(methylthio)-1,4-naphthoquinone on Fungi

| Organism | Minimal Inhibitory Concentration (mcg./ml.) |
| --- | --- |
| Candida albicans, E 83 | 25 |
| Cryptococcus neoformans, E 183 | 1 |
| Microsporum canis, ATCC 10214 | 2.5 |
| Microsporum gypseum, ATCC 14683 | 5 |
| Phialophthora jeanselmi, E 16 | 50 |
| Trichophyton tonsurans, NIH 662 | 2.5 |
| Trichophyton mentagrophytes, E 11 | 5 |
| Trichophyton rubrum, E 97 | 5 |

The invention will be described in greater detail in conjunction with the following specific examples.

EXAMPLE 1

Preparation of
2-hydroxy-3-(ethylthio)-1,4-naphthoquinone

A solution of 8.70 g. of 1,4-dioxo-2,3-oxido-1,2,3,4-tetrahydronaphthalene and 4.20 g. of sodium ethylmercaptide in 200 ml. of absolute ethanol is stirred at room temperature for 22.5 hours and then evaporated under reduced pressure to give a brown semi-solid residue. Water and excess acetic acid are added to the residue and the precipitated oil crystallizes. The precipitate is removed by filtration, washed with water and dried to give 8.92 g. of reddish-brown crystals, m.p. 93°–125°C. The crystals are triturated with 25 ml. of dichloromethane, chilled and filtered. The filtrate is diluted with hexane to turbidity, chilled and filtered to give 1.64 g. of crude product as reddish-purple crystals, m.p. 86°–89°C. Recrystallization from dichloromethane-hexane affords 2-hydroxy-3-(ethylthio)-1,4-naphthoquinone as red-brown crystals, m.p. 91°–94°C.

EXAMPLE 2

Preparation of
2-hydroxy-3-(isopropylthio)-1,4-naphthoquinone

By replacing the sodium ethylmercaptide employed in Example 1 with an equimolecular quantity of sodium isopropylmercaptide and following substantially the same procedure described in Example 1, there is obtained the 2-hydroxy-3-(isopropylthio)-1,4-naphthoquinone.

EXAMPLE 3

Preparation of
2-hydroxy-3-(ethylthio)-1,4-naphthoquinone and
2-hydroxy-3-(methylthio)-1,4-naphthoquinone A mixture of 2.48 g. of the 3-ethylmethylsulfonium ylide of 2-hydroxy-1,4-naphthoquinone, 1.43 ml. of 70–72% perchloric acid and 25 ml. of pyridine is heated under reflux for 3.5 hours and evaporated under reduced pressure to a reddish-black gummy residue. The residue is extracted with four 35-ml. portions of boiling ethyl ether and the combined ether extracts are evaporated under reduced pressure to a reddish-black oil which crystallizes. Recrystallization from chloroform-petroleum ether(30°–60°C.) gives 1.04 g. of a 3:1 mixture of 2-hydroxy-3-(ethylthio)-1,4-naphthoquinone and 2-hydroxy-3-(methylthio)-1,4-naphthoquionone as purple-black crystals, m.p. 83°–85°C. These are separated by chromatography on silica gel using mixtures of heptane, methanol and water.

EXAMPLE 4

Preparation of
2-hydroxy-3-(n-propylthio)-1,4-naphthoquinone and
2-hydroxy-3-(methylthio)-1,4-naphthoquinone The procedure of Example 3 is repeated, substituting an equimolecular amount of the 3-methyl n-propylsulfonium ylide of 2-hydroxy-1,4-naphthoquinone for the 3-ethylmethylsulfonium ylide of 2-hydroxy-1,4-naphthoquinone employed in that example. There is thus obtained 2-hydroxy-3-(methylthio)-1,4-naphthoquinone and 2-hydroxy-3-(n-propylthio)-1,4-naphthoquinone.

EXAMPLE 5

Preparation of
2-hydroxy-3-(n-pentylthio)-1,4-naphthoquinone and
2-hydroxy-3-(methylthio)-1,4-naphthoquinone The procedure of Example 3 is repeated, substituting an equimolar amount of the 3-methyl-n-pentylsulfonium ylide of 2-hydroxy-1,4-naphthoquinone for the 3-ethylmethylsulfonium ylide of 2-hydroxy-1,4-naphthoquinone employed in that example. There is thus obtained 2-hydroxy-3-(methylthio)-1,4-naphthoquinone and 2-hydroxy-3-(n-pentylthio)-1,4-naphthoquinone.

EXAMPLE 6

Preparation of
2-methoxy-3-(methylthio)-1,4-naphthoquinone

To a chilled solution of 4.40 g. of 2-hydroxy-3-(methylthio)-1,4-naphthoquinone in 100 ml. of dichloromethane is added, portionwise over 5 minutes, a solution of a stoichiometric excess of diazomethane in 100 ml. of ethyl ether. When the addition is completed, the solution is removed from the ice-bath and allowed to stand at room temperature for 3 hours. Filtration of the resulting suspension gives 1.32 g. of brown crystals of the by-product dimethylsulfonium ylide of 2-hydroxy-1,4-naphthoquinone, decomposes at 251°–252°C. The ether filtrate is evaporated under reduced pressure to give a reddish-orange crystalline residue. Two recrystallizations from absolute ethanol give 1.90 g. of 2-methoxy-3-(methylthio)-1,4-naphthoquinone as orange crystals, m.p. 87°–89°C.

EXAMPLE 7

Preparation of
2-methoxy-3-(ethylthio)-1,4-naphthoquinone

In place of the 2-hydroxy-3-(methylthio)-1,4-naphthoquinone of Example 6 there is employed an equimolecular quantity of 2-hydroxy-3-(ethylthio)-1,4-naphthoquinone whereby the 2-methoxy-3-(ethylthio)-1,4-naphthoquinone is obtained in equally good yield.

EXAMPLE 8

Preparation of
2-ethoxy-3-(n-propylthio)-1,4-naphthoquinone

Treatment of 2-hydroxy-3-(n-propylthio)-1,4-naphthoquinone with diazoethane by the procedure of Example 6 gives 2-ethoxy-3-(n-propylthio)-1,4-naphthoquinone.

EXAMPLE 9

Preparation of
2-ethoxy-3-(isopropylthio)-1,4-naphthoquinone

In the manner described in Example 6, treatment of 2-hydroxy-3-(isopropylthio)-1,4-naphthoquinone with diazoethane furnishes 2-ethoxoy-3-(isopropylthio)-1,4-naphthoquinone.

EXAMPLE 10

Preparation of
2-(n-propoxy)-3-(ethylthio)-1,4-naphthoquinone

In the manner described in Example 6, treatment of 2-hydroxy-3-(ethylthio)-1,4-naphthoquinone with 1-diazopropane furnishes 2-(n-propoxy)-3-(ethylthio)-1,4-naphthoquinone.

EXAMPLE 11

Preparation of
2-(n-hexyloxy)-3-(methylthio)-1,4-naphthoquinone

In the manner described in Example 6, treatment of 2-hydroxy-3-(methylthio)-1,4-naphthoquinone with 1-diazohexane furnishes 2-(n-hexyloxy)-3-(methylthio)-1,4-naphthoquinone.

EXAMPLE 12

Preparation of
2-methoxy-3-(n-pentylthio)-1,4-naphthoquinone

Treatment of 2-hydroxy-3-(n-pentylthio)-1,4-naphthoquinone with diazomethane by the procedure of Example 6 gives 2-methoxy-3-(n-pentylthio)-1,4-naphthoquinone.

We claim:

1. A compound selected from the group consisting of those of the formula:

wherein $R_1$ is hydrogen or an unbranched alkyl group having up to 5 carbon atoms and $R_2$ is an alkyl group having up to 6 carbon atoms.

2. The compound according to claim 1 wherein $R_1$ is hydrogen and $R_2$ is methyl; 2-methoxy-3-(methylthio)-1,4-naphthoquinone.

3. The compound according to claim 1 wherein $R_1$ is hydrogen and $R_2$ is ethyl; 2-methoxy-3-(ethylthio)-1,4-naphthoquinone.

4. The compound according to claim 1 wherein $R_1$ is methyl and $R_2$ is methyl; 2-ethoxy-3-(methylthio)-1,4-naphthoquinone.

5. The compound according to claim 1 wherein $R_1$ is methyl and $R_2$ is ethyl; 2-ethoxy-3-(ethylthio)-1,4-naphthoquinone.

6. The compound according to claim 1 wherein $R_1$ is hydrogen and $R_2$ is n-propyl; 2-methoxy-3-(n-propylthio)-1,4-naphthoquinone.

7. The compound according to claim 1 wherein $R_1$ is hydrogen and $R_2$ is isopropyl; 2-methoxy-3-(isopropylthio)-1,4-naphthoquinone.

8. The compound according to claim 1 wherein $R_1$ is n-butyl and $R_2$ is n-butyl; 2-(n-pentyloxy)-3-(n-butylthio-1,4-naphthoquinone.

9. The compound according to claim 1 wherein $R_1$ is n-pentyl and $R_2$ is isobutyl; 2-(n-hexyloxy)-3-(isobutylthio)1,4-naphthoquinone.

* * * * *